UNITED STATES PATENT OFFICE.

SAMUEL GROSS, OF DOVER TOWNSHIP, PENNSYLVANIA.

IMPROVEMENT IN FLAVORING WHISKY.

Specification forming part of Letters Patent No. 114,552, dated May 9, 1871.

*To all whom it may concern:*

Be it known that I, SAMUEL GROSS, of Dover township, in the county of York and State of Pennsylvania, have invented an Improvement in the Art of Flavoring Spirits, of which the following is a specification:

The object of my invention is to impart agreeable flavors, combined with medicinal qualities, to whisky; to which end my improvement consists in a novel process of distilling the flavoring fruit—such as oranges, lemons, or limes—with spirits, and condensing the vapor of distillation, as hereinafter set forth.

In order to carry out the objects of my invention, I take oranges, lemons, limes, or other fruits, slice or mash them, and put them into a still of ordinary construction. To one box of oranges I add about fifty gallons of whisky and one-third as much water as whisky. Heat is then applied, and the vapor of distillation is condensed into high wine, which is then reduced with water to the proper strength of whisky. Spirits thus flavored have been found by experiment very beneficial to invalids. The process, moreover, imparts to new whisky the flavor and properties of old whisky, and removes the raw flavor incident to new whisky.

I do not broadly claim flavoring spirits by adding flavoring materials during the distillation.

I claim as of my invention—

The improved spirits herein described, produced by flavoring whisky by redistilling it with the flavoring fruit in the still, as set forth.

In testimony whereof I have hereunto subscribed my name.

SAMUEL GROSS.

Witnesses:
FRANK GEISE,
E. D. ZIEGLER.